(No Model.) 2 Sheets—Sheet 1.
J. W. CLOUD.
PIN OPERATING DEVICE FOR CAR COUPLINGS.
No. 468,060. Patented Feb. 2, 1892.
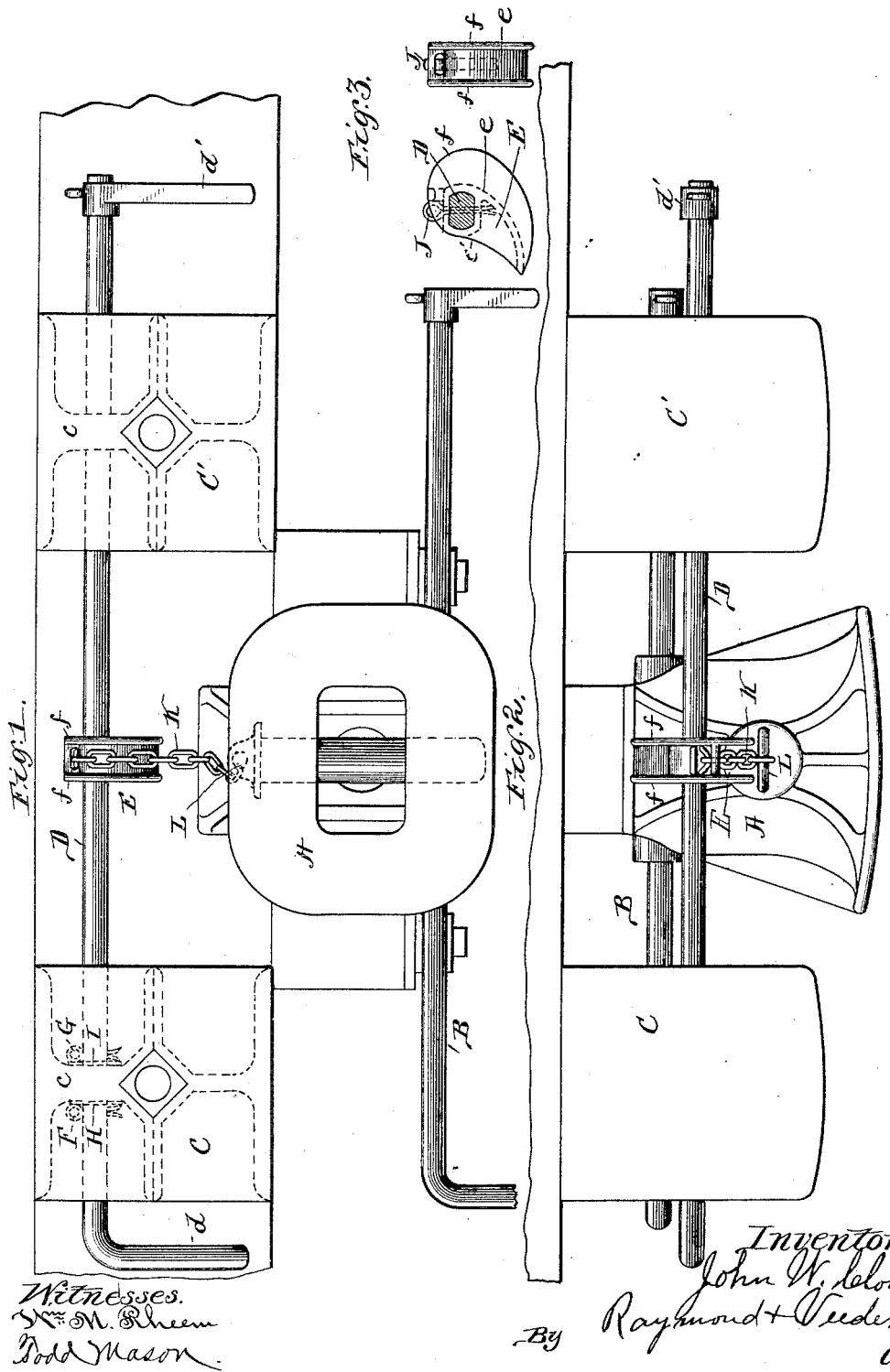

(No Model.) 2 Sheets—Sheet 2.
J. W. CLOUD.
PIN OPERATING DEVICE FOR CAR COUPLINGS.

No. 468,060. Patented Feb. 2, 1892.

Witnesses.
Wm M. Rheem
Todd Mason

Inventor.
John W. Cloud
By Raymond & Vieder
Atty's.

UNITED STATES PATENT OFFICE.

JOHN W. CLOUD, OF CHICAGO, ILLINOIS.

PIN-OPERATING DEVICE FOR CAR-COUPLINGS.

SPECIFICATION forming part of Letters Patent No. 468,060, dated February 2, 1892.

Application filed June 1, 1891. Serial No. 394,682. (No model.)

*To all whom it may concern:*

Be it known that I, JOHN W. CLOUD, residing at Chicago, county of Cook, State of Illinois, have invented certain new and useful Improvements in Pin-Operating Devices for Car-Couplers, of which the following is a specification.

My invention relates to devices for operating the pin of the ordinary link-and-pin coupler or the locking-pin of an automatic coupler. It is intended to provide a means for uncoupling and for holding the pin when raised, if desired.

Another purpose of my invention is to so mount the shaft through which the pin is operated as to enable it to withstand the shocks and blows to which it is subjected in service without derangement or detachment.

Figure 4:
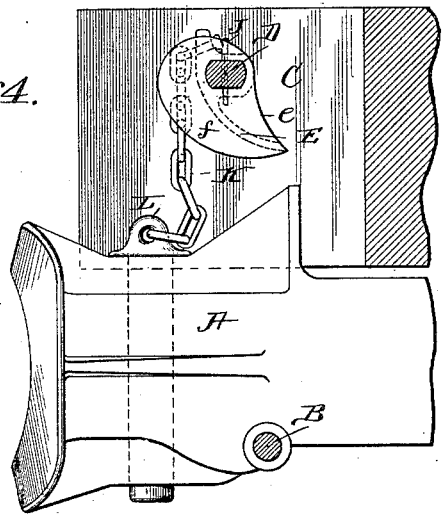
Figure 5:
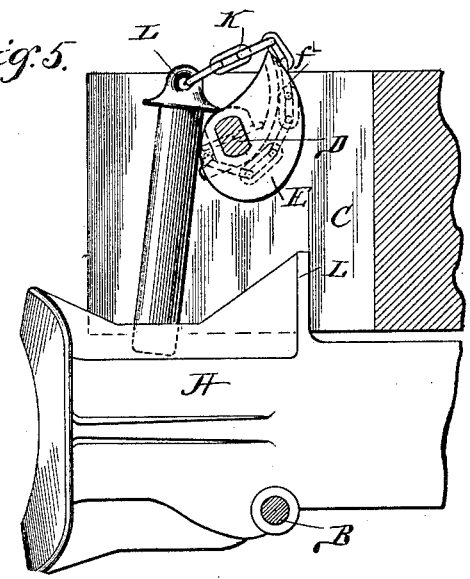
Figure 6:
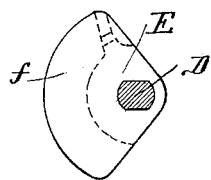

In the accompanying drawings, Figure 1 is an end view of a coupler to which my improvement is attached. Fig. 2 is a plan view of the same. Fig. 3 shows two views of the cam upon the pin-operating shaft. Figs. 4 and 5 are side views showing the pin in its lowered and raised positions, respectively. Fig. 6 shows a modified form of the lifting-cam.

A is the draw-head of the coupler, which in this instance is represented as having a link-handling shaft B attached, such as is used in the coupler forming the subject of an application for United States Letters Patent filed by me December 2, 1890, Serial No. 373,333; but as such link-handling devices form no part of the present invention it is not herein specifically described.

C C' are the dead-blocks attached to the end of the car. Said dead-blocks are made of metal, in accordance with the standard adopted by the master car-builders, except that the upper half $c$ of the vertical rib is made of extra thickness in order to afford a good bearing for the shaft D, by which the pin is operated. The shaft is of cylindrical section, as shown in Figs. 3 to 5, except that one or more flattened faces are formed thereon. One end is bent to form a handle $d$, and the other end is provided with a detachable handle $d'$.

At the middle of the shaft D is a cam E, the aperture through which conforms to the shape of the shaft D, so as to prevent its turning thereon. End motion in the shaft is prevented by cotters F G and washers H I upon opposite sides of the rib $c$, and the movement of the cam E lengthwise of the shaft D is prevented by a similar cotter J, which passes through the cam and the shaft. The handle $d'$ is secured in the same manner as the cam E. The shape of the cam E is seen in Figs. 3 to 5 and in Fig. 6. The side $e$, which is out in the ordinary position of the shaft D, which is that permitting the pin to be lowered, is convexly curved, and a chain K is attached at one end to the pin L and at the other to the remote end of the curvilinear face $e$. To prevent the chain K from displacement, flanges $f\,f$ are provided on each side of the cam. The back $e'$ of the cam E is cut away or so formed as to approach closely to the shaft D, the purpose of this being to allow the pin to swing back close to the shaft D when it is fully raised, as shown in Fig. 5, in which position it has little or no tendency to rotate the shaft D, and hence will be securely held up, especially as the shaft D rotates through more than a semicircle in raising the pin to its extreme uppermost position, and the weight of the handles $d\,d'$ passes by the center of rotation of the shaft D and assists in preventing its return. The conformation of the cam E may be varied without departing from my invention, one such variation being shown in Fig. 6, in which the convexly-curved face of the cam is part of a circle whose center is the axis of rotation of the rod D. It will be sufficient to fulfill the purpose of my invention if the front face $e$ be made sufficiently long to take up enough of the chain to raise the link to the extreme height necessary and the back face be cut away so as to allow the pin to swing backward after it has been raised sufficiently high to lie close to the shaft D, so as not to exercise a rotative pull thereon.

What I claim as new, and desire to secure by Letters Patent, is as follows:

1. The combination, with a coupler, of a pin-operating device consisting of a shaft and a cam thereon, said cam having a curvilinear convex face and having its back approaching closely to the shaft, and a chain attached at one end to the pin and at the other to the cam at the remote end of said curvilinear face, said shaft being provided with handles depending perpendicularly when the pin is lowered and being rotatable through more than a semicircle, substantially as and for the purpose set forth.

2. The combination, with a coupler, of a pin-operating device consisting of a shaft journaled in the dead-blocks and secured by washers H I and cotters on each side of the rib c of one dead-block, a cam on said shaft, said cam having a curvilinear convex face and its back approaching closely to said shaft, and a chain attached at one end to the pin and at the other to a cam at the remote end of said curvilinear face, substantially as and for the purpose set forth.

JOHN W. CLOUD.

Witnesses:
   IRWIN VEEDER,
   TODD MASON.